May 25, 1965 S. HELMERSSON 3,185,919
MEANS FOR SUPPRESSING FERROMAGNETIC OSCILLATIONS ARISING
IN ELECTRICAL INSTALLATIONS
Filed March 16, 1962
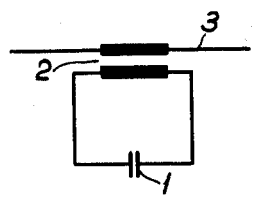
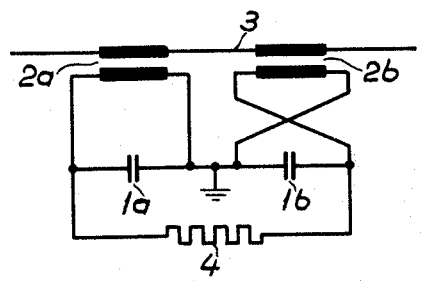
INVENTOR.
Sven Helmersson
BY
Bailey, Stephens & Huettig
Attorneys United States Patent Office 3,185,919
Patented May 25, 1965

3,185,919
MEANS FOR SUPPRESSING FERROMAGNETIC OSCILLATIONS ARISING IN ELECTRICAL INSTALLATIONS
Sven Helmersson, Vasteras, Sweden, assignor to Allmanna Svenska Elektriska Aktiebolaget, Vasteras, Sweden, a Swedish corporation
Filed Mar. 16, 1962, Ser. No. 180,076
Claims priority, application Sweden, Mar. 18, 1961, 2,914/61
2 Claims. (Cl. 323—77)

The present invention relates to a means for suppressing ferromagnetic oscillations in electrical installations containing series-capacitors which are connected with the aid of series-transformers to said installations.

With electrical installations for low voltage, for example furnace installations, it is unsuitable to connect series-capacitors directly to the feeding conductors of the load object since capacitors for low voltages are expensive and bulky. Series-capacitors for low voltage installations are therefore usually connected via a series-transformer with suitable turns ratio. With transformers having capacitive load, however, unsuppressed oscillations sometimes occur, so-called relaxation oscillations, which normally have basic frequency and occur when the iron core of the transformer is saturated.

A known method of counteracting the said phenomenon is to over dimension the iron cores in the transformers so that they are not saturated whatever the load is. The disadvantage with this method is that over dimensioning the iron cores of transformers is extremely expensive.

The said disadvantage may be avoided by means of the present invention which is based on the principle that a suppressing resistor is connected over the series-capacitor battery in a balance circuit in such a way that the voltage over the suppressing resistor is during normal operation zero, so that no current flows through the resistor and no losses are caused in this. When ferromagnetic oscillations occur, however, the circuit is brought out of balance so that a voltage occurs over the resistor and forms a damping current through this. Thereby the load of the transformers will cease to be mainly capacitive and conditions for continued oscillations will not prevail. At the same time resistance in the transformers, and alternatively also in the conductive element, will consume the energy of the oscillations and contribute to the suppression of the oscillations.

The invention is characterised in that the series-transformer is divided into at least two series-connected transformer units, each feeding separate parts of the series-capacitor battery, whereby the different groups, each consisting of a series-transformer with a capacitor connected to its secondary winding, are dimensioned for the same secondary voltage but for different power, that the iron core of the transformer dimensioned for less power is so over dimensioned that it is not saturated at any load arising in practice, and that the said parts of the capacitor battery are electrically connected in such a way that only negligible or no current flows between the connection points at normal load, but that on the contrary, a considerable current flows between said connection points when ferromagnetic oscillations arise.

The invention is described in the following with reference to the accompanying schematical drawing which for the sake of simplicity shows only a one-phase connecting system. FIGURE 1 shows a known device for connecting a series-capacitor in a feeding conductor to an installation for low voltage, and FIGURE 2 shows a corresponding means modified so that it also comprises a suppressing means for suppressing relaxation oscillations in the installation.

In electrical feeding conductors for very low voltage, for example, certain distribution conductors and similar conductors for furnace installations, it is not suitable to connect series-capacitors directly in series with the feeding conductor since capacitors for such low voltage and having sufficient capacitance would be extremely expensive. Instead, in accordance with FIGURE 1, capacitors 1 are connected, dimensioned for high voltage to the feeding conductor 3 via the series transformer 2. The disadvantage with connecting the series-capacitors to the feeding conductors over series-transformers is that the cores of the transformers are saturated at high load impulses or at short circuits if they are not dimensioned so amply that the cores are not saturated whatever the load. Since, however, for economic reasons such over-dimensioning of the cores of the series-transformers is undesirable, it has been tried instead to suppress the high voltage amplitude caused by relaxation oscillations, which may occur when the cores of the series-transformers are saturated. A device for suppressing undesired ferromagnetic oscillations is shown in FIGURE 2. The series-transformer 2 shown in FIGURE 1 has in FIGURE 2 been divided into two series-connected parts 2a and 2b. The transformers 2a and 2b are built for the same secondary voltage but for completely different powers. The transformer 2a, which is the main transformer, is dimensioned for greater power than the transformer 2b. The iron core for the transformer 2a is normally dimensioned, while on the other hand the iron core for the smaller transformer 2b is strongly over-dimensioned so that in practice it is not saturated at any load. In the same way the capacitor 1 in FIGURE 1 is divided into two parts, namely 1a and 1b in accordance with FIGURE 2. Both the capacitors are connected each to its own transformer 2a and 2b. The capacitors are also dimensioned for the same voltage but different power, corresponding to the power distribution of the transformers. The capacitors 1a and 1b are connected to each other over a suppressing resistance 4 in such a way that the equal voltages over the capacitors 1a and 1b are turned in opposite phase, so that the voltage difference over the damping resistor 4 will be more or less zero. If a strong load impulse occurs, the iron core in the transformer 2a is saturated while the iron core of the transformer 2b is so amply dimensioned that it is not saturated. When the transformer 2a is saturated, the normally substantially capacitive circuit connected to it will, because of the saturation, instead become substantially inductive, which in this case means that the voltage over the capacitor 1a is phase shifted about 180°.

This can easily be seen by regarding the well known equivalent scheme for a transformer with the turn ratio 1/1. If, for the sake of simplicity, we presuppose that the series transformer 2a is an ideal transformer with the turn ratio 1/1, it can be substituted by an inductance connected in series with the line, and further this inductance is to be imagined as a variable one, as the iron core of the transformer 2a can be more or less saturated. Thus, instead of the transformer 2a and the capacitor connected across it, we can imagine a group consisting of a variable inductance with a capacitor connected across it, the group being series connected in the line. Saturation of the transformer 2a will then correspond to a decrease of said inductance. If this decrease, or in other words the saturation of the transformer 2a, is sufficiently great, said group will change from capacitive to inductive character, and the voltage across the capacitor will get a phase lead of substantially 90° in relation to the line current instead of the phase lag of substantially 90° which it had prior to saturation. Because of this phase shift a voltage arises over the damping resistor 4, which voltage may amount to double the capacitor voltage. This voltage forces a current through the damping resistor 4, so that the energy development in the resistor 4 consumes the energy of the oscillating circuit and suppresses the oscillations. The suppression is also due to the fact that a current through the damping resistance alters the phase angle of the main transformer load so that it is not sufficiently capacitive for keeping continued oscillations alive. A further advantage with the invention is that the top voltages to which the series-capacitors may be subjected are limited to such a low value that the protecting spark gap over the capacitors is superfluous.

In certain cases the suppressing resistor 4 may be replaced by a direct connection of the capacitors.

I claim:

1. For connection to an electrical installation in order to suppress ferromagnetic oscillations therein, a line having two primary transformer windings series connected therein, at least two capacitors, separate secondary windings one associated with each primary winding, means connecting each secondary winding to one of the capacitors, each transformer and capacitor connected therewith constituting a group, the groups being dimensioned for the same secondary voltage but different power, the iron core of the transformer dimensioned for less power being over-dimensioned to such a degree that it is not saturated at any load arising in practice, and means connecting the capacitors to prevent substantial current flow through such connecting means at normal loads while permitting a substantial current flow when ferromagnetic oscillations arise.

2. A device as claimed in claim 1 in which the secondary windings are connected to the capacitors in opposed phase relationship with each other, and a damping resistance is connected to the capacitors in parallel with the secondary windings.

References Cited by the Examiner

UNITED STATES PATENTS 1,017,634  2/12  Campos _____ 317—61.5
2,858,455  10/58  Trabut _____ 307—58

LLOYD McCOLLUM, *Primary Examiner.*